United States Patent [19]
Morikawa

[11] Patent Number: 5,613,108
[45] Date of Patent: Mar. 18, 1997

[54] ELECTRONIC MAIL PROCESSING SYSTEM AND ELECTRONIC MAIL PROCESSING METHOD

[75] Inventor: Takashi Morikawa, Nishinomiya, Japan

[73] Assignee: Minolta Camera Kabushiki Kaisha, Osaka, Japan

[21] Appl. No.: 198,900

[22] Filed: Feb. 18, 1994

[30] Foreign Application Priority Data

Feb. 24, 1993 [JP] Japan .................................. 5-035273

[51] Int. Cl.$^6$ .................................................. G06F 17/30
[52] U.S. Cl. ............................................. 393/616; 379/93
[58] Field of Search .............................. 395/600; 379/93; 364/419

[56] References Cited

U.S. PATENT DOCUMENTS 5,208,748  5/1993  Flores et al. ............................ 364/419
5,379,340  1/1995  Overend .................................. 379/93

FOREIGN PATENT DOCUMENTS 4129446  4/1992  Japan .

OTHER PUBLICATIONS

PTO Office of Integrated Software Systems, "Microsoft Mail for Windows, a guide to using MS Mail on PTOnet", May 1993.

*Primary Examiner*—Thomas G. Black
*Assistant Examiner*—Cheryl Lewis
*Attorney, Agent, or Firm*—Price, Gess & Ubell

[57] ABSTRACT

An electronic mail system in which a mail management method is improved in order to reduce the complexity and labour of handling transmitted information so that its convenience is increased. In an electronic mail system in which a plurality of data processing systems exchange messages through mailboxes MB utilizing the stored and forward system, the data processing system which receives a mail M transferred from the mailbox MB is provided with an electronic mail terminal utility. When the data processing system receives the mail M, the electronic mail terminal utility classifies a data file written in the mail M according to specific data contained in the mail M and stores the data file in an appropriate folder based on a result of the classification.

20 Claims, 8 Drawing Sheets

Fig. 7

7 FOLDER TABLE

| HEADER CODE STRINGS (FILE ATTRIBUTE INFORMATION) Att | | | | | FOLDER NAME |
|---|---|---|---|---|---|
| 0C | 1B | 57 | 50 | 31 | FOLDER 1 |
| 0C | 1B | 43 | 4B | 31 | FOLDER 2 |
| 0C | 1B | 2D | 46 | 31 | FOLDER 3 |
| ⋮ | | | | | ⋮ |

ELECTRONIC MAIL PROCESSING SYSTEM AND ELECTRONIC MAIL PROCESSING METHOD

BACKGROUND OF THE INVENTION (1) Field of the Invention

The present invention relates to an electronic mail processing system and electronic mail processing method.

(2) Related Arts

Data communication called "electronic mail" in which a store and forward system is adopted is widely made through various networks such as local area networks and private communication networks.

An electronic mail system is generally composed of a host processor undertaking the management of electronic mailboxes and a plurality of computer systems with the function of transmitting and receiving mails. A mail, which is one unit of transmitted data, consists of an envelop part containing control information such as a user's address and postal indications; and a content part containing optional information which is the main information of transmitted data.

Control information in the envelop part is used when the host processor performs mail transfer processing and the format (the arrangement of data) of the envelop part is fixed in the system.

Optional information in the content part is classified into message information such as messages to be conveyed from one end user to another and data information such as programs and numerical data. Usually, when data information is transmitted, message information is also transmitted as a "transmission notice" and in such a case, the content part consists of one or a plurality of heading files corresponding to the message information and one or a plurality of data files corresponding to the data information. In this case, each of the data files is incorporated in a mail, being attached to the heading file, and the data file is, therefore, called "attachment file".

In a known electronic mail system, a computer system (hereinafter referred to as "receiving terminal") which receives a mail from a host processor stores a mail in a receiving folder (storage area) irrespective of the contents of the mail.

The operator for the receiving terminal (a user operating the receiving terminal) looks at a list of mails stored in the receiving folder at a convenient time and accesses a desired mail to see its contents. If there is an attachment file, the operator instructs "folder changing", i.e., transferring of an attachment file from the receiving folder (shared folder) to a dedicated folder. At that time, the operator identifies the file attribute of the attachment file from message information (e.g., a file name or addressee's name) and specifies a dedicated folder suited for the identified file attribute.

In such a system, the classification of file attributes is at the discretion of the operator and the operator can preliminarily create dedicated folders in consideration of the working situation of the system. For example, if the file is created by using applications software which allows the user to create attachment files, the file will be transferred to a dedicated folder for word-processing software and if the file is created by using worksheet software, it will be transferred to a dedicated folder for worksheet software.

When a plurality of users operate receiving terminals, for example, in an office, a dedicated folder is provided for every hierarchically classified item, that is, each user has his own dedicated folders.

Since attachment files are thus sorted by the use of the dedicated files, when the operator carries out, later on, a specific type of work such as word-processing, invoicing or accounting using particular applications software, the attachment files can be easily accessed by the applications software and therefore the operational efficiency of the system increases. Even if there are a plurality of users, each user can readily access his attachment file.

Such an electronic mail system makes it more convenient to use information received in the form of attachment files.

Such a conventional system, however, presents the disadvantage that sorting of attachment files is not executed until the operator's instruction is released and the operator has to take the burden of doing many works at the time of sorting, such as accessing a mail, confirming message information, identifying the attribute of each attachment file, selecting a dedicated folder for each attachment file and instructing a transfer of an attachment file to the dedicated file which has been selected.

SUMMARY OF THE INVENTION

A prime object of the invention is therefore to reduce the complexity and labour of handling transmitted information such as data information, thereby increasing the convenience of an electronic mail system.

The above object is fulfilled by an electronic mail processing system comprising a receiving device for receiving an electronic mail from a host processor which undertakes the management of mailboxes, a plurality of folders for storing an electronic mail, and a management device for classifying a data file written in the received electronic mail in accordance with specific data included in the electronic mail, and selecting a folder for storing the data file in accordance with a result of the classification.

The electronic mail received by the receiving device may comprise an envelop part containing control information used for transmission processing performed by the host processor and a content part containing main information to be transmitted, the data file and the specific data may be contained in the content part, and the management device may comprise a data file extraction unit for extracting the data file from the content part and a folder selection unit for classifying the extracted data file in accordance with the specific data, and selecting a folder for storing the data file in accordance with a result of the classification.

The data file to be classified may be an attachment file attached to a heading file containing message information, and the data file extraction unit may be an attachment file extraction unit for discriminating between the heading file and the attachment file which are contained in the content part and extracting the attachment file from the content part.

The specific data may be file attribute information contained in the attachment file, the management device may include a file attribute information extraction unit for extracting the file attribute information from the attachment file extracted by the attachment file extraction unit, and the folder selection unit may include a table for showing the association between the file attribute information and folders and a table search unit for searching the table in accordance with the extracted file attribute information to classify the attachment file.

The electronic mail received by the receiving device may comprise an envelop part which contains control information used for transmission processing performed by the host processor and whose format is fixed, and a content part containing main information to be transmitted, the specific data may be folder specification information written in the envelop part, and the management device may include a folder selection unit for classifying the data file based on the folder specification information written in the envelop part and selecting a folder for storing the data file in accordance with a result of the classification.

The management device may further include a folder creating unit for creating a new folder if the folder selected by the folder selection unit does not exist.

The data file to be classified may be an attachment file attached to a heading file containing message information, and the management device may include an attachment file extraction unit for discriminating between the heading file and the attachment file which are contained in the content part and extracting the attachment file from the content part.

The electronic mail received by the receiving device may comprise an envelop part which contains control information used for transmission processing performed by the host processor and a content part containing main information to be transmitted, the data file to be classified may be an attachment file attached to a heading file which is included in the content part, containing message information, and the management device may include a folder specification information searching unit for searching the envelop part for folder specification information and selecting a folder used to store the attachment file in accordance with the folder specification information if it exists in the envelop part, a folder creating unit for creating a new folder if the folder selected by the folder specification information searching unit does not exist, and an attachment file attribute information searching unit for extracting file attribute information from the attachment file and selecting a folder used to store the attachment file in accordance with the extracted file attribute information if the folder specification information does not exist in the envelop part.

The above object is fulfilled by an electronic mail processing method comprising the 1st step of receiving an electronic mail from a host processor which undertakes the management of mailboxes, the 2nd step of storing the received electronic mail in a first folder, the 3rd step of classifying a data file written in the electronic mail which has been stored in the first folder in accordance with specific data contained in the electronic mail, the 4th step of selecting a second folder for storing the data file in accordance with a result of the classification in the 3rd step, and the 5th step of transferring the data file written in the electronic mail stored in the first folder to the second folder.

The electronic mail may comprise an envelop part containing control information used for transmission processing performed by the host processor and a content part containing main information to be transmitted, the data file and the specific data may be contained in the content part, and the 3rd step may include the 1st sub-step of extracting the data file from the content part of the electronic mail stored in the first folder and the 2nd sub-step of classifying the extracted data file in accordance with the specific data.

The data file to be classified may be an attachment file attached to a heading file containing message information, and the 1st sub-step of the 3rd step may be for discriminating between the heading file and the attachment file which are contained in the content part of the electronic mail stored in the first folder and extracting the attachment file from the content part.

The specific data may be file attribute information contained in the attachment file, and the 2nd sub-step of the 3rd step may be for extracting the file attribute information from the attachment file extracted in the 1st sub-step and searching a table which shows the association between the file attribute information and folders, based on the extracted file attribute information in order to classify the attachment file.

The above object is also fulfilled by an electronic mail processing method comprising the 1st step of receiving an electronic mail from a host processor which undertakes the management of mailboxes, the 2nd step of storing the received electronic mail in a first folder, the 3rd step of classifying a data file written in the electronic mail which has been stored in the first folder in accordance with specific data contained in the electronic mail, the 4th step of selecting a second folder for storing the data file in accordance with a result of the classification in the 3rd step, and the 5th step of transferring the data file written in the electronic mail stored in the first folder to the second folder.

The electronic mail received by the receiving device may comprise an envelop part which contains control information used for transmission processing performed by the host processor and whose format is fixed, and a content part containing main information to be transmitted, the specific data may be folder specification information written in the envelop part, and the 3rd step may include the sub-step of selecting a folder for storing the data file in accordance with the folder specification information written in the envelop part.

The 4th step may include the sub-step of creating the second folder if the second folder which has been selected does not exist.

The data file to be classified may be an attachment file attached to a heading file containing message information, the sub-step of the 3rd step may be for discriminating between the heading file and the attachment file which are contained in the content part of the electronic mail stored in the first folder and extracting the attachment file from the content part.

The above object is also fulfilled by an electronic mail processing method comprising the 1st step of receiving an electronic mail from a host processor which undertakes the management of mailboxes, the 2nd step of storing the received electronic mail in a first folder, the 3rd step of classifying a data file written in the electronic mail which has been stored in the first folder in accordance with specific data contained in the electronic mail, the 4th step of selecting a second folder for storing the data file in accordance with a result of the classification in the 3rd step, and the 5th step of transferring the data file written in the electronic mail stored in the first folder to the second folder.

The electronic mail received by the receiving device may comprise an envelop part containing control information used for transmission processing performed by the host processor and a content part containing main information to be transmitted, the data file to be classified may be an attachment file attached to a heading file, and the attachment file is included in the content part while the heading file contains message information, and the 3rd step may include the 1st sub-step of searching the envelop part for folder specification information and selecting a folder used for storing the attachment file in accordance with the folder specification information if it exists in the envelop part, the 2nd sub-step of creating a new folder if the selected folder does not exist, and the 3rd sub-step of extracting file attribute information from the attachment file and selecting a folder for storing the attachment file in accordance with the file attribute information if the folder specification information does not exist in the envelop part.

The 3rd sub-step of the 3rd step may be for searching a table which shows the association between the file attribute information and folders, in accordance with the extracted file attribute information to classify the attachment file if the folder specification information does not exist in the envelop part and for selecting a folder for storing the attachment file in accordance with a result of the classification.

According to the invention, when a mail is received from the mail box, a data file corresponding to a part of or whole transmitted information excluding the envelop part is classified for management in accordance with specific data stored in any part of the whole mail including the envelop part. Specifically, a data file of a received mail will be stored in a folder specified by the contents of specific data in the mail. This enables automatic sorting of data files of a plurality of mails which have been received in batches or separately.

With this arrangement, the labour and complexity of handling transmitted information such as data information can be reduced so that the convenience of the electronic mail system is increased.

BRIEF DESCRIPTION OF THE DRAWINGS

These and other objects, advantages and features of the invention will become apparent from the following description thereof taken in conjugation with the accompanying drawings which illustrate a specific embodiment of the invention. In the drawings:

FIG. 7 is a diagram showing one example of the contents of a folder table; and

PREFERRED EMBODIMENT

Figure 1:
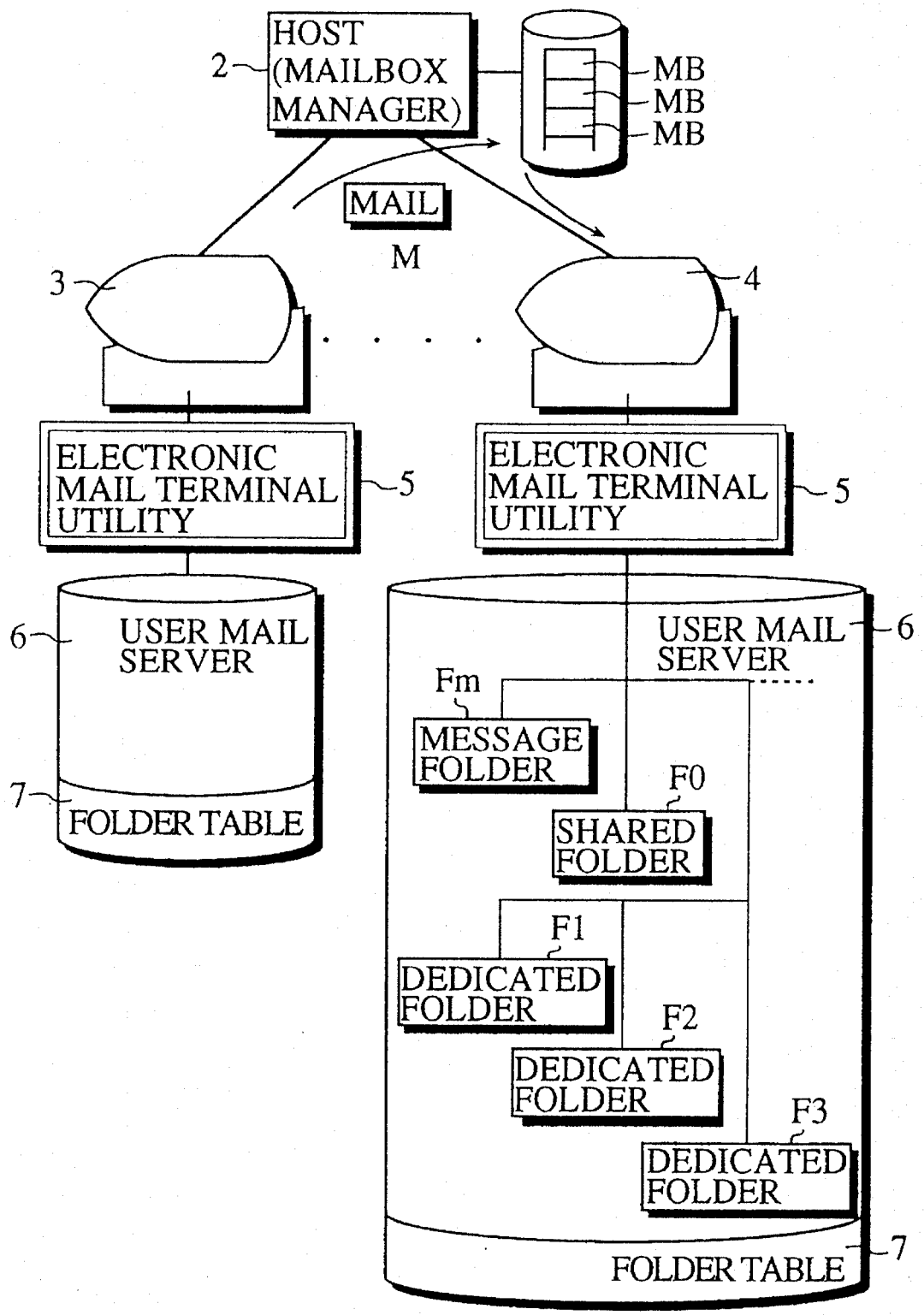
FIG. 1 is a block diagram schematically showing the structure of an electronic mail system according to an embodiment of the invention.

FIG. 1 schematically shows, in block form, the structure of an electronic mail system 1 according to one embodiment of the invention.

The electronic mail system 1 is composed of a host 2 undertaking the management of mailboxes MB; and a plurality of data processing systems 3, 4 for transmitting data to each other through the host 2.

The host 2 is, for example, a general-purpose large-sized computer system and has the function of providing various network services including electronic mail service (i.e., mailbox service).

When a mail M addressed to the data processing system 4 is input (put in the post) from the data processing system 3 for example, the host 2 once stores the mail M in the mailbox MB for the data processing system 4. Upon receipt of a request for transferring from the data processing system 4 or at a predetermined time, the host 2 transfers (delivers) the mail M to the data processing system 4.

Each of the data processing systems 3, 4 is a stand-alone computer system composed of, for example, a personal computer, display unit, hard disk etc. and various kinds of application programs can be used with it.

In the data processing systems 3, 4, an electronic mail terminal utility 5, which is a kind of application program, performs processing on signals concerned with mail services provided by the host 2.

The electronic mail terminal utility 5 maintains a user mail server 6 which is a data base having a plurality of folders for storing data associated with electronic mails, and a folder table 7 in which types of data are shown in relation to folder names for ready reference.

The contents of the user mail server 6 and the folder table 7 are created individually for each of the data processing systems 3, 4 and therefore their contents in the data processing system 3 are usually different from those of the data processing system 4. However, the users of the data processing systems 3, 4 may make arrangements for using the same number of folders and/or the same folder names. In the data processing system 4 of this embodiment, the user mail server 6 has, as shown in FIG. 1, a message folder Fm, a shared folder F0 and three dedicated folders F1 to F3 as receiving folders.

Figure 2:
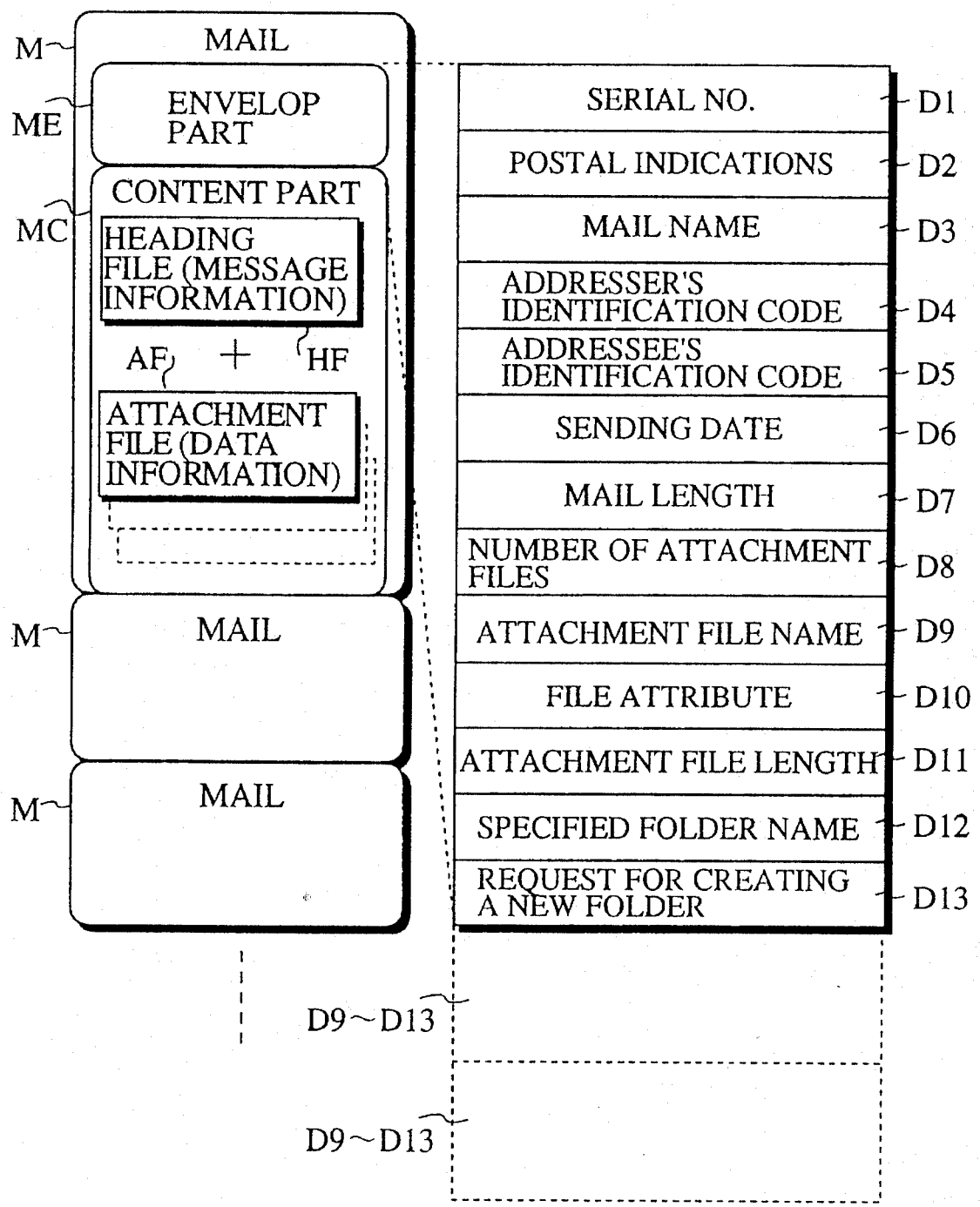
FIG. 2 is a diagram showing the arrangement of data in a mail.

FIG. 2 shows the arrangement of data in the mail M. The mail M is composed of a content part MC containing optional information to be conveyed from one end user to another and an envelop part ME containing control information used to correctly transmit the content part MC and to properly manage the content part MC at the receiving side.

The content part MC is composed of one or a plurality of heading files HF that are a group of text data corresponding to message information and one or a plurality of attachment files AF that are attached to the heading files HF in order to send data information. The file arrangement (i.e., the number and type of data files which are a collection of data representing optional information) of the content part MC varies for every case. In some cases, the mail M to be transmitted includes the content part MC which consists of only data files corresponding to message information or only data files corresponding to data information.

The format of the envelop part ME is fixed in the electronic mail system 1 and the envelop part ME is composed of 13 items of directory data D1 to D13 by which processing operations performed by the host 2 and the data processing systems 3, 4 are specified.

The directory data D1 to D13 are 13 items of data indicating a serial No. allocated to every mail M; the postal indication of the mail M (ordinary, registered, confidential, express, multiple address etc.); the name of the mail M; an addresser's identification code; an addressee's identification code; a sending date; the length of the mail M (excluding the attachment files AF); the number of attachment files AF; the name of the attachment file AF; the attribute of the attachment file AF; the length of the attachment file AF; the name of the specified folder; and the presence or absence of a request for creating a new folder, respectively.

One set of the directory data D9 to D13 corresponds to one attachment file AF, and therefore, when N-number of attachment files AF exist in the content part MC, N-sets of directory data D9 to D13 are written in the envelop part ME.

The attribute of the attachment file AF mentioned herein is the type of file classified in accordance with a desired feature such as applications software used for creating the file, or the presence or absence of a protect.

Figure 3:
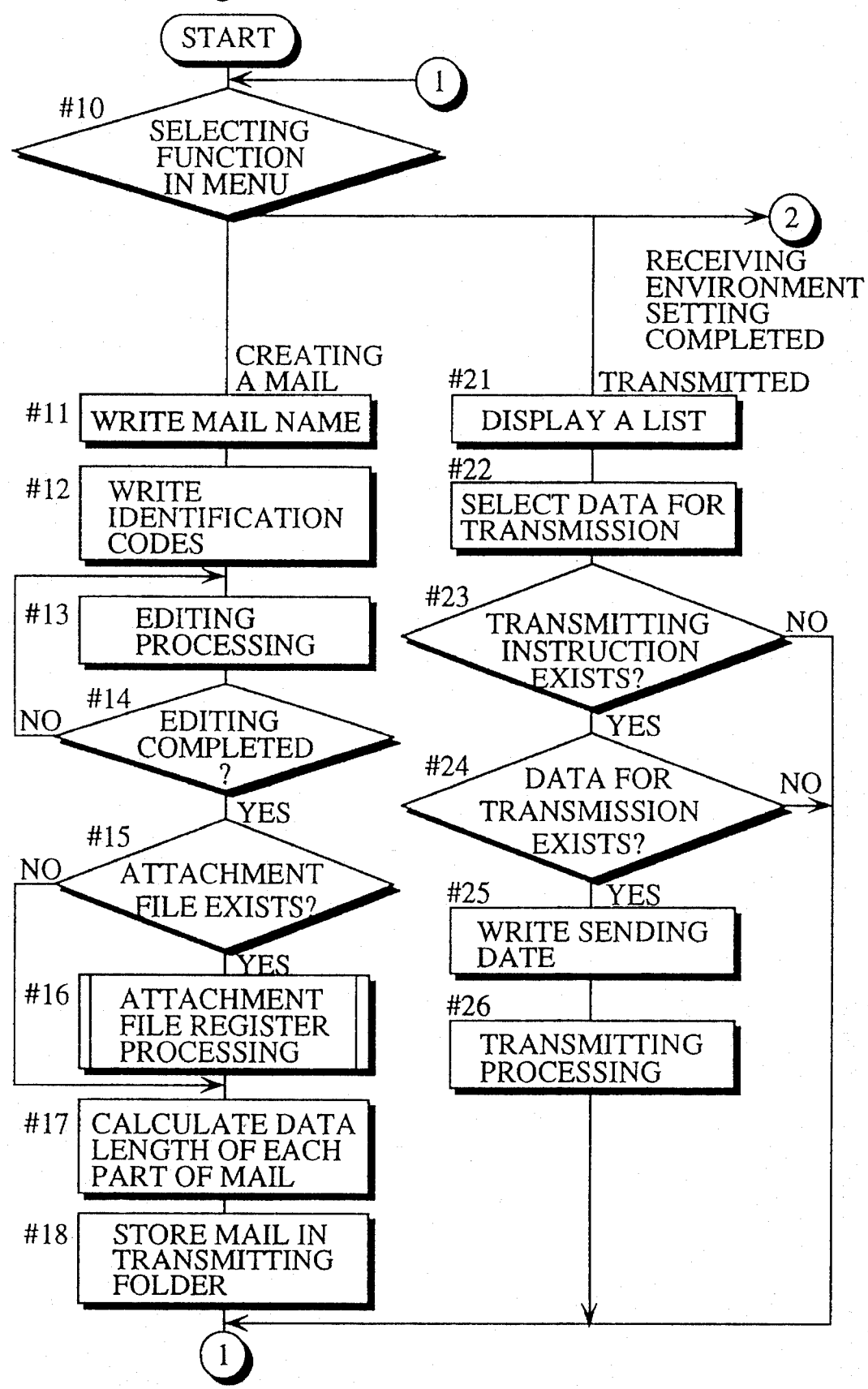
FIG. 3 is a flowchart schematically showing processing performed by an electronic mail terminal utility.
Figure 4:
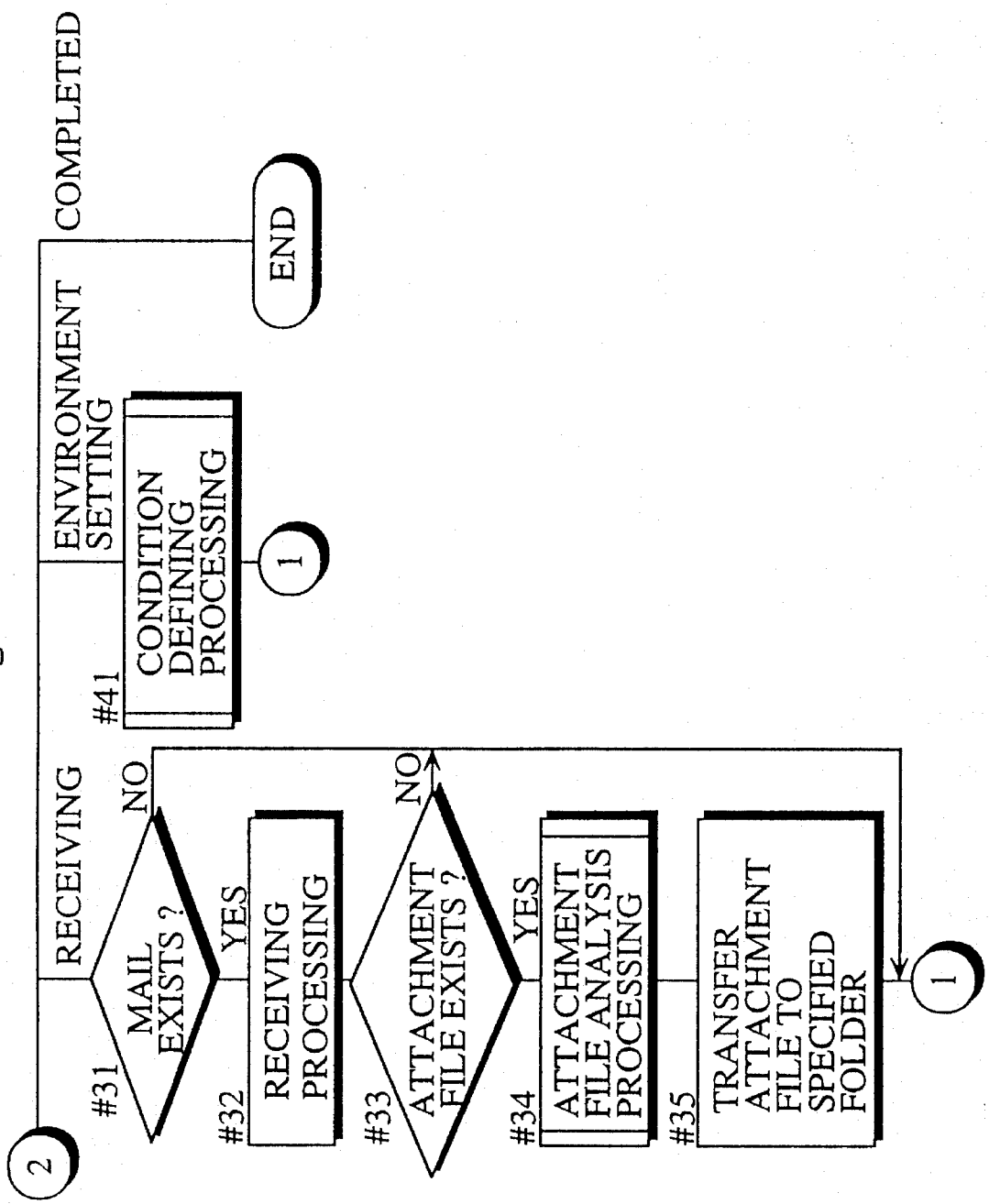
FIG. 4 is a flowchart schematically showing processing performed by an electronic mail terminal utility.

FIGS. 3 and 4 schematically show the flow of the processing performed by the electronic mail terminal utility 5.

The electronic mail terminal utility (hereinafter referred to as "utility") 5 has four functions, i.e., creating the mail M, transmitting the mail M, receiving the mail M and environment setting such as registering the management conditions of the mail M.

When the operator of the data processing system 4 for example starts up the utility 5, the utility 5 displays a function-selection screen (initial menu) on a display unit, showing the four functions as well as termination as commands to be selected, and checks which command has been selected from the initial menu.

[Creating the mail M]

When the operator selects the mail creating function, the utility 5 writes a mail name, an addresser's identification code and an addressee's identification code in the envelop part ME as the directory data D3, D4, D5, these pieces of information having been input by the operator through a key board. Thereafter, the utility 5 displays an interactive screen to require an operator's instruction and then executes editing processing for creating the content part MC (#11 to 13).

Upon receipt of an instruction to terminate the editing, the utility 5 executes attachment file register processing for writing the name of the attachment file AF (directory data D9) in the envelop part ME. Then, the utility 5 calculates the length of the attachment file AF and the length of the mail M to store in the envelop part ME as the directory data D11, D7 (#14 to 17). The substantially finished mail M is stored in the transmitting folder (#18).

Figure 5:
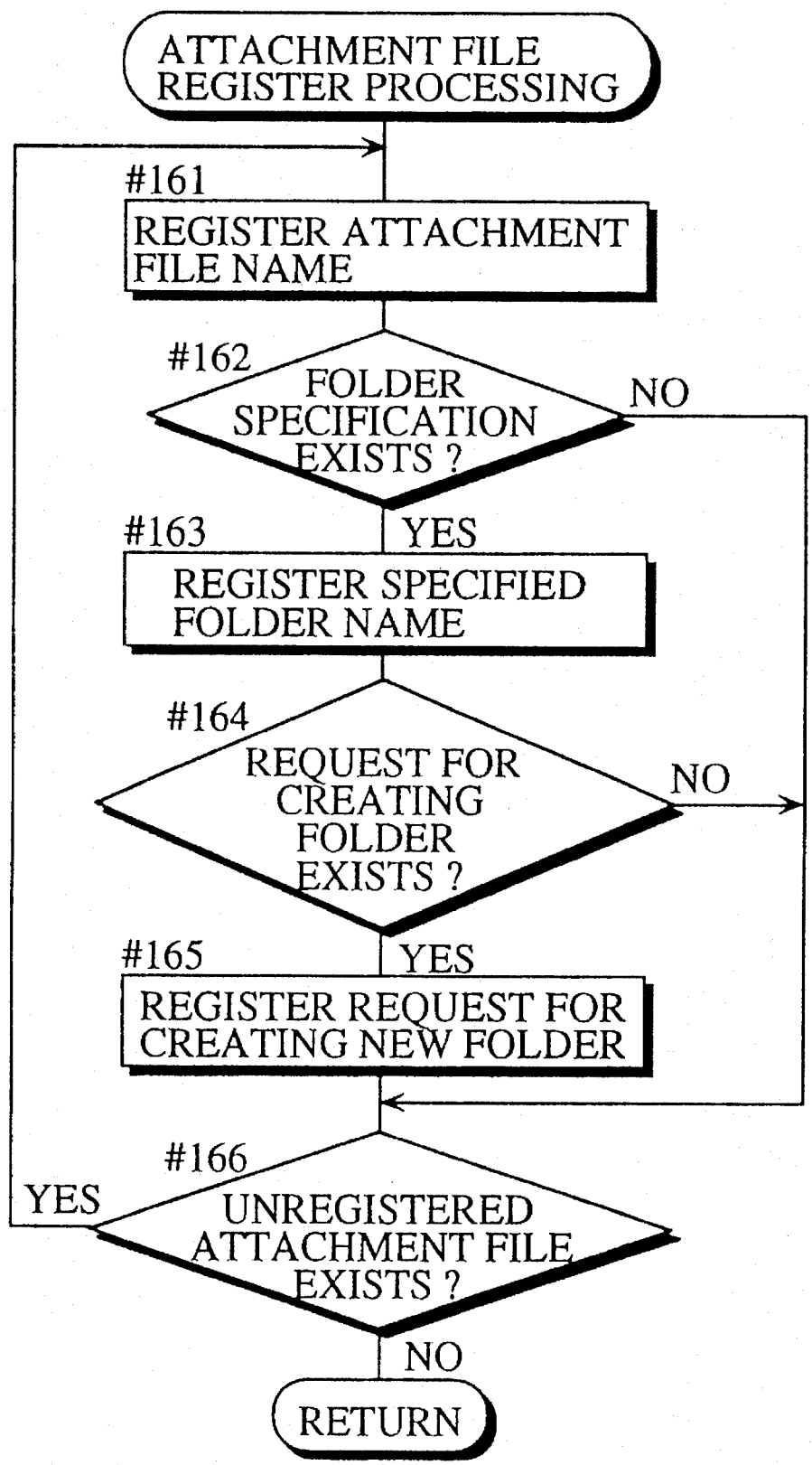
FIG. 5 is a flowchart showing the details of the attachment file register processing of FIG. 3.

FIG. 5 shows the flow of the attachment file register processing of FIG. 3.

In this sub-routine, the utility 5 writes the attachment file name input by the operator in the envelop part ME as the directory data D9 (#161). With this step, one attachment file AF has been registered as transmitted data.

When specifying a folder for storing the attachment file AF at the receiving side, the name of the specified folder is written as the directory data D12. If a request for creating a new folder is made when the specified folder does not exist at the receiving side, a flag for indicating the presence of the request is set and stored as the directory data D13 (#162 to 165).

If there are a plurality of attachment files AF, the same processing is performed for every attachment file AF, and then, the program proceeds to Step 17 in FIG. 3 (#166).

[Transmitting the mail M]

When the operator selects the transmitting function in the initial menu (see FIG. 3), the utility 5 firstly displays a list of mails M stored in the transmitting folder (#21).

The utility 5 selects one or a plurality of mails M specified by the operator as data to be transmitted. In response to a transmitting instruction sequentially input by the operator, a sending date (directory data D6) is written in the envelop part ME of the mail M selected as data to be transmitted and then the mail M is sent to the host 2 (#22 to 26).

[Receiving the mail M]

When the operator selects the receiving function in the initial menu, the utility 5 makes enquiries to the host 2 about the presence or absence of the mail M addressed to the data processing system 4, and performs receiving processing for receiving the mail M if there exists (#31, 32). During the receiving processing, the heading file HF is stored in the message folder FM whilst the attachment file AF is once stored in the shared folder F0.

Thereafter, the utility 5 performs attachment file analysis processing in which a folder suited for the attachment file AF is set and the attachment file AF is transferred from the shared folder F0 to the set, suitable folder (one of the dedicated folders F1 to F3 or a new folder) (#33, 34, 35). In short, the attachment file AF is classified (attribute identification) and stored. This facilitates the editing operation (processing) of the attachment file AF which will be performed later by the use of applications software.

Figure 6:
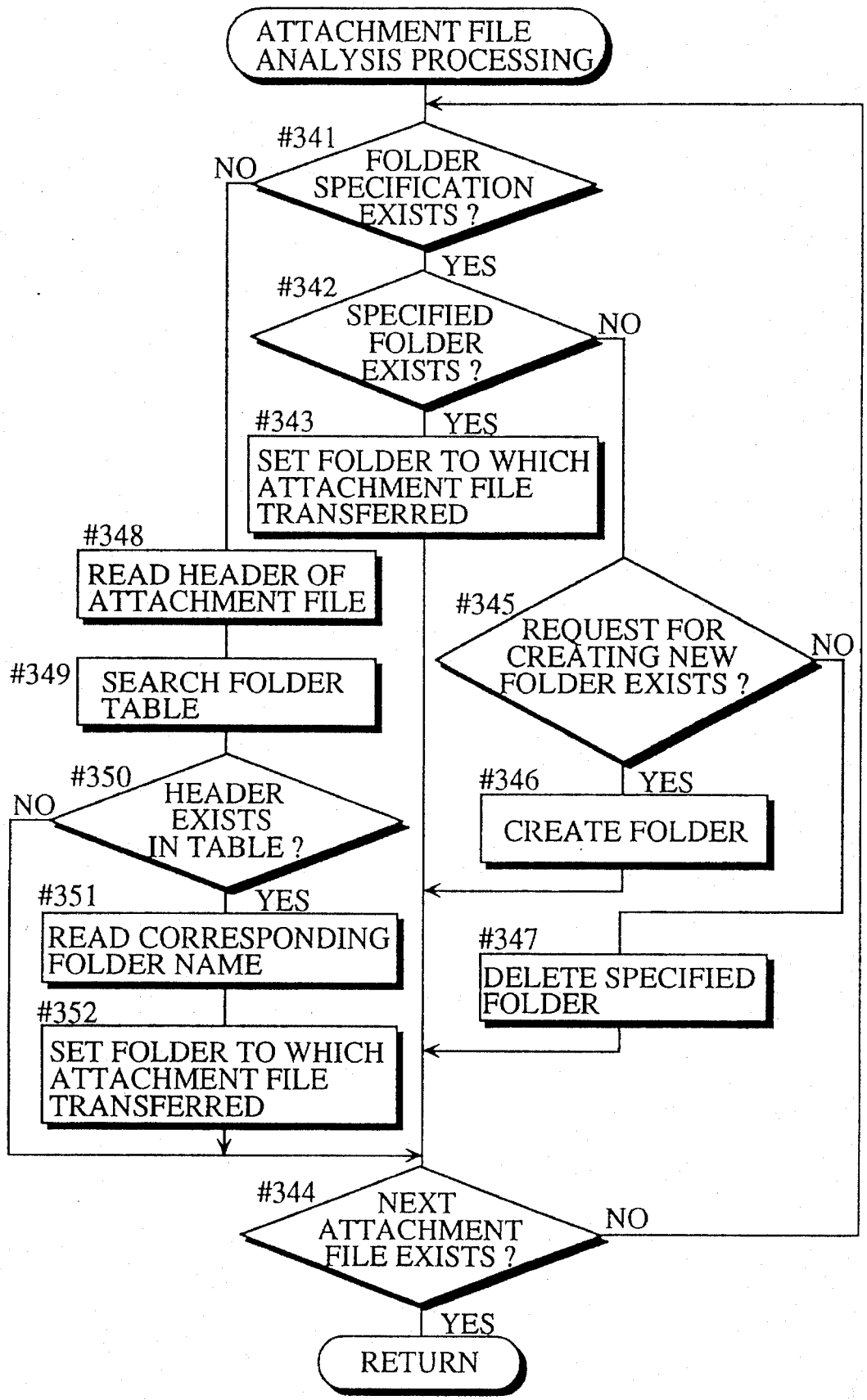
FIG. 6 is a flowchart showing the details of the attachment file analysis processing of FIG. 4.

FIG. 6 shows the flow of the attachment file analysis processing of FIG. 4.

If folders are specified for all the attachment files AF of the mail M at the transmitting side and there exist all the specified folders within the user mail server 6, the utility 5 sets, in this sub-routine, the dedicated folders F1 to F3 specified by the directory data D12 (the name of a specified folder) as folders suitable for storing the attachment files AF (i.e., transferring destination for the attachment files AF) and terminates the processing of the sub-routine (#341 to 344).

If a request for creating a new folder is made when the folder specified by the transmitting side does not exist within the user mail server 6, a new folder having the specified name is created and set as the transferring destination for the attachment file AF. On the other hand, if there is no request for creating a new folder, the specified folder name is deleted and the folder specification is canceled (#345 to 347).

If a folder for storing the attachment file AF is not specified by the transmitting side, the utility 5 reads data of a specified length (header) recorded in the leading end of the attachment file AF as file attribute information Att (#348).

The utility 5 then searches the folder table 7 in order to check the presence or absence of the read file attribute information Att. FIG. 7 shows one example of the contents of the folder table 7. In FIG. 7, each code which appears in the column of header code strings (file attribute information Att) corresponds to a file name. By collating the codes listed in the column of header code strings with the code in the leading end of the attachment file AF, the folder name corresponding to the attachment file AF can be retrieved (#349, 350).

If the file attribute information Att is found in the folder table 7, the folder name corresponding to the file attribute information Att is read and one of the dedicated folders F1 to F3 having the folder name which has been read is set as the transferring destination for the attachment file AF (#351, 352).

If the attachment file AF is, for example, a text document, the file attribute information Att is the ASCII code which corresponds to the first character of the document or a specific code (extension) given by the applications software which the operator at the transmitting side has used when creating the attachment file AF. In the latter case, the value of the specific code varies depending on the applications software which has been used.

It is to be understood from the above description that, in the attachment file analysis processing, the transferring destination for the attachment file AF which is a sort of data file is set in accordance with specific data stored in the mail M, such as the directory data D12 in the envelop part ME or the file attribute information Att which is part of the attachment file AF.

If the transferring destination for the attachment file AF is not set in the attachment file analysis processing, the attachment file AF will not be transferred but kept in the shared folder F0.

[Environment setting]

Reference is again made to FIGS. 3 and 4. When the operator selects the environment setting function in the initial menu, the utility 5 performs condition defining processing (#41).

Figure 8:
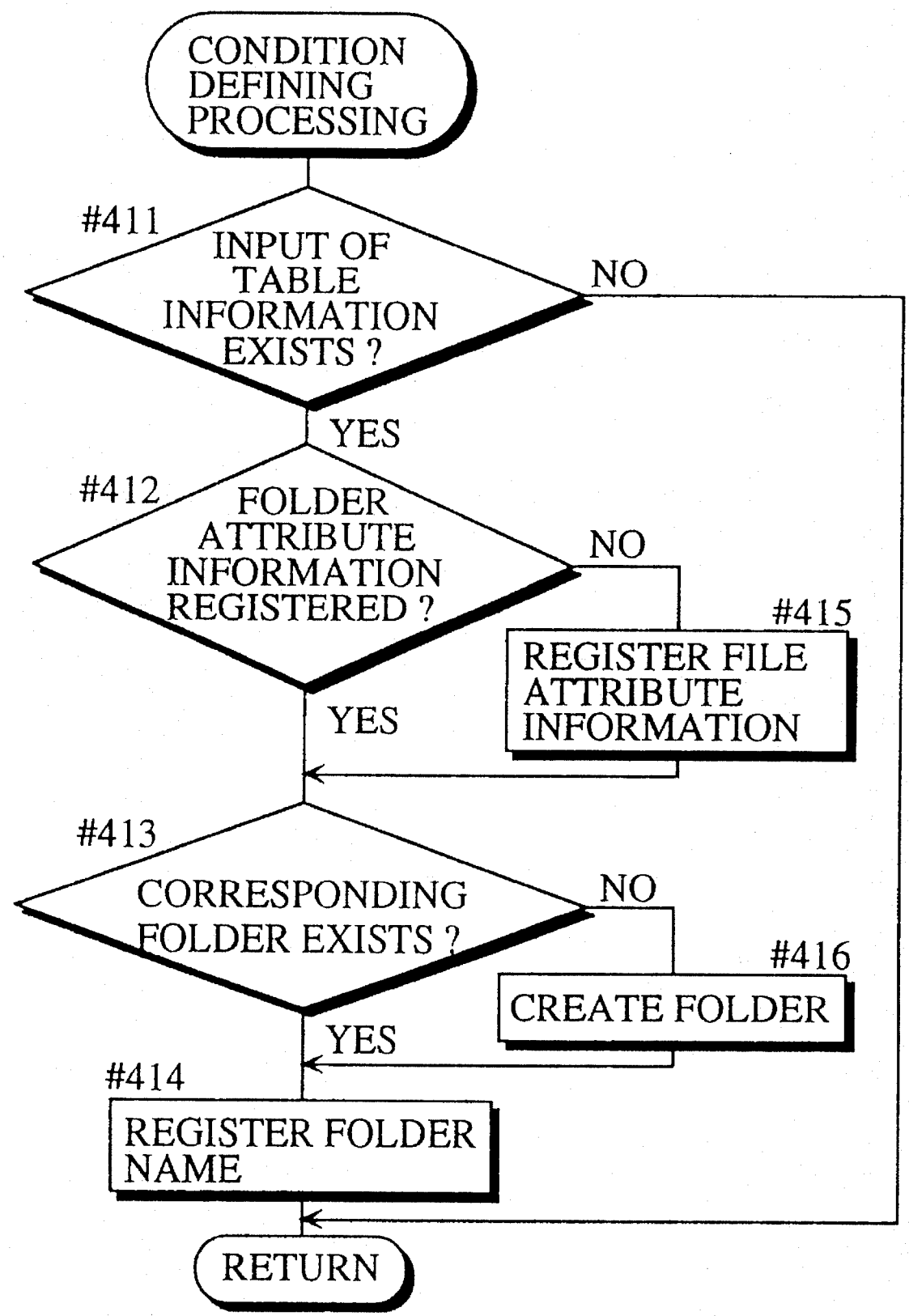
FIG. 8 is a flowchart showing the details of the condition defining processing of FIG. 4.

FIG. 8 shows the flow of the condition defining processing of FIG. 4.

In response to an input of table data composed of the file attribute information Att and a folder name, the utility 5 firstly enters the file attribute information Att in the folder table 7 (#411, 412, 415).

If the dedicated folders F1 to F3 do not have the input folder name, a new dedicated folder is created and the input folder name is put to the new folder. Then, the folder name is entered in the table folder 7 in combination with the file attribute information Att (#413, 414, 416).

According to the foregoing embodiment, the directory data D12 (a specified folder name) for instructing the management condition of the attachment file AF at the receiving side is written in the envelop part ME of which format is fixed in the electronic mail system 1. With this arrangement, there is no need to decide between users where the data is to be written, unlike the case where information instructing the management condition of the attachment file AF is written in the content part MC as message information.

As a result, a new user can specify a folder to the receiving side without difficulties and reading of data by the electronic mail terminal utility 5 is facilitated.

According to the foregoing embodiment, since the attachment file AF is classified in accordance with the file attribute information Att originally included in the attachment file AF, there is no need to write data for instructing the management condition of the attachment file AF in every mail at the transmitting side. This saves labour in creating a mail.

According to the foregoing embodiment, since the attachment files AF are classified by applications software and stored, when the attachment file AF is edited (processed) at the receiving side by the use of the same applications software as used for creating, the operation can be easily performed.

Although the attachment files AF are classified at the receiving side in the foregoing embodiment, the heading files HF containing message information may be classified instead.

Although the foregoing embodiment has been described with the mail M having the content part MC containing message information (heading files HF) and data information (attachment files AF), the invention can also be applied to a mail having no message information.

Although the present invention has been fully described by way of example with reference to the accompanying drawings, it is to be noted that various changes and modification will be apparent to those skilled in the art. Therefore, unless otherwise such changes and modifications depart from the scope of the present invention, they should be construed as being included therein.

I claim:

1. An electronic mail processing system comprising:

(1) receiving means for receiving electronic mail from a host processor which undertakes the management of mailboxes;

(2) a plurality of folders for storing electronic mail; and (3) management means for automatically classifying a data file written in the received electronic mail in accordance with specific data included in the electronic mail; and (4) means for automatically selecting a folder for storing the data file in accordance with a result of the classification.

2. An electronic mail processing system according to claim 1, wherein the electronic mail received by the receiving means comprises an envelope part containing control information used for transmission processing performed by the host processor and a content part containing the main information to be transmitted;

wherein the data file and the specific data are contained in the content part; and wherein the management means comprises (1) a data file extraction unit for extracting the data file from the content part and (2) a folder selection unit for classifying the extracted data file in accordance with the specific data and selecting a folder for storing the data file in accordance with a result of the classification.

3. An electronic mail processing system according to claim 2, wherein the data file to be classified is an attachment file attached to a heading file containing message information; and wherein the data file extraction unit is an attachment file extraction unit for discriminating between the heading file and the attachment file which are contained in the content part and extracting the attachment file from the content part.

4. An electronic mail processing system according to claim 3, wherein the specific data is file attribute information contained in the attachment file;

wherein the management means includes a file attribute information extraction unit for extracting the file attribute information from the attachment file extracted by the attachment file extraction unit; and wherein the folder selection unit includes (1) a table for showing the association between the file attribute information and folders and (2) a table search unit for searching the table in accordance with the extracted file attribute information to classify the attachment file.

5. An electronic mail processing system according to claim 1, wherein the electronic mail received by the receiving means comprises an envelope part which contains control information used for transmission processing performed by the host processor and whose format is fixed, and a content part containing the main information to be transmitted;

wherein the specific data is folder specification information written in the envelope part; and wherein the management means includes a folder selection unit for classifying the data file based on the folder specification information written in the envelope part and selecting a folder for storing the data file in accordance with a result of the classification.

6. An electronic mail processing system according to claim 5, wherein the management means further includes a folder creating unit for creating a new folder if the folder selected by the folder selection unit does not exist.

7. An electronic mail processing system according to claim 6, wherein the data file to be classified is an attachment file attached to a heading file containing message information; and wherein the management means includes an attachment file extraction unit for discriminating between the heading file and the attachment file which are contained in the content part and extracting the attachment file from the content part.

8. An electronic mail processing system according to claim 1, wherein the electronic mail received by the receiving means comprises an envelope part which contains control information used for transmission processing performed by the host processor and a content part containing the main information to be transmitted;

wherein the data file to be classified is an attachment file attached to a heading file which is included in the content part, containing message information; and wherein the management means includes (1) a folder specification information searching unit for searching the envelope part for folder specification information and selecting a folder used to store the attachment file in accordance with the folder specification information if it exists in the envelope part, (2) a folder creating unit for creating a new folder if the folder selected by the folder specification information searching unit does not exist, and (3) an attachment file attribute information searching unit for extracting file attribute information from the attachment file and selecting a folder used to store the attachment file in accordance with the extracted file attribute information if the folder specification information does not exist in the envelope part.

9. An electronic mail processing system according to claim 8, wherein the attachment file attribute information searching unit comprises (1) a table for showing the association between the file attribute information and folders, and (2) a table search unit for searching the table in accordance with the extracted file attribute information to classify the attachment file.

10. An electronic mail processing method comprising:

the 1st step of receiving electronic mail from a host processor which undertakes the management of mailboxes;

the 2nd step of storing the received electronic mail in a first folder;

the 3rd step of automatically classifying a data file written in the electronic mail which has been stored in the first folder in accordance with specific data contained in the electronic mail;

the 4th step of selecting a second folder for storing the data file in accordance with a result of the classification in the 3rd step; and the 5th step of transferring the data file written in the electronic mail stored in the first folder to the second folder.

11. An electronic mail processing method according to claim 10, wherein the electronic mail message comprises an envelope part containing control information used for transmission processing performed by the host processor and a content part containing the main information to be transmitted;

wherein the data file and the specific data are contained in the content part; and wherein the 3rd step includes the 1st sub-step of extracting the data file from the content part of the electronic mail stored in the first folder and the 2nd sub-step of classifying the extracted data file in accordance with the specific data.

12. An electronic mail processing method according to claim 11, wherein the data file to be classified is an attachment file attached to a heading file containing message information; and wherein the 1st sub-step of the 3rd step is for discriminating between the heading file and the attachment file which are contained in the content part of the electronic mail message stored in the first folder and extracting the attachment file from the content part.

13. An electronic mail processing method according to claim 12, wherein the specific data is file attribute information contained in the attachment file; and wherein the 2nd sub-step of the 3rd step is for extracting the file attribute information from the attachment file extracted in the 1st sub-step and searching a table which shows the association between the file attribute information and folders, based on the extracted file attribute information in order to classify the attachment file.

14. An electronic mail processing method according to claim 10, wherein the electronic mail received by the receiving means comprises an envelope part which contains control information used for transmission processing performed by the host processor and whose format is fixed, and a content part containing main information to be transmitted;

wherein the specific data is folder specification information written in the envelope part; and wherein the 3rd step includes the sub-step of selecting a folder for storing the data file in accordance with the folder specification information written in the envelope part.

15. An electronic mail processing method according to claim 14, wherein the 4th step includes the sub-step of creating the second folder if the second folder which has been selected does not exist.

16. An electronic mail processing method according to claim 15, wherein the data file to be classified is an attachment file attached to a heading file containing message information; and wherein the sub-step of the 3rd step is for discriminating between the heading file and the attachment file which are contained in the content part of the electronic mail stored in the first folder and extracting the attachment file from the content part.

17. An electronic mail processing method according to claim 10, wherein the electronic mail received by the receiving means comprises an envelope part containing control information used for transmission processing performed by the host processor and a content part containing the main information to be transmitted;

wherein the data file to be classified is an attachment file attached to a heading file, and the attachment file is included in the content part while the heading file contains message information; and wherein the 3rd step includes the 1st sub-step of searching the envelope part for folder specification information and selecting a folder used for storing the attachment file in accordance with the folder specification information if it exists in the envelope part; the 2nd sub-step of creating a new folder if the selected folder does not exist; and the 3rd sub-step of extracting file attribute information from the attachment file and selecting a folder for storing the attachment file in accordance with the file attribute information if the folder specification information does not exist in the envelope part.

18. An electronic mail processing method according to claim 17, wherein the 3rd sub-step of the 3rd step is for searching a table which shows the association between the file attribute information and folders, in accordance with the extracted file attribute information to classify the attachment file if the folder specification information does not exist in the envelope part and for selecting a folder for storing the attachment file in accordance with a result of the classification.

19. An electronic mail processing system comprising:

receiving means for receiving electronic mail messages with attached data files;

folders for storing the received data files; and management means for automatically classifying and storing the received data files in the folders comprising:
- a data file extraction unit for extracting the data file from the electronic mail message;
- a data file attribute information extraction unit for extracting file attribute information from the data file extracted by the data file extraction unit; and
- a folder selection unit for classifying the extracted data file in accordance with the file attribute information extracted by the data file attribute extraction unit and for selecting a folder for storing the data file in accordance with the classification.

20. An electronic mail processing system according to claim 1, wherein the folder selection unit comprises:

- a table for showing the association between the file attribute information and the folders: and
- a table search unit for searching the table in accordance with the extracted file attribute information in order to classify the attachment file.

* * * * *